United States Patent
Soin et al.

(10) Patent No.: US 8,079,076 B2
(45) Date of Patent: Dec. 13, 2011

(54) DETECTING STOLEN AUTHENTICATION COOKIE ATTACKS

(75) Inventors: Tarun Soin, Fremont, CA (US); Vineet Dixit, Mountain View, CA (US); Yixin Sun, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 11/592,920

(22) Filed: Nov. 2, 2006

(65) Prior Publication Data

US 2008/0127323 A1     May 29, 2008

(51) Int. Cl.
H04L 29/00     (2006.01)

(52) U.S. Cl. ........... 726/12; 726/3; 726/4; 726/5; 726/6; 726/7; 726/2

(58) Field of Classification Search ................ 726/2, 12, 726/3–7; 709/219
See application file for complete search history.

(56) References Cited

U.S. PATENT DOCUMENTS

| | | | |
|---|---|---|---|
| 6,092,196 A * | 7/2000 | Reiche ............................. 726/6 |
| 6,374,359 B1 | 4/2002 | Shrader et al. |
| 6,857,009 B1 * | 2/2005 | Ferreria et al. ................ 709/219 |
| 7,016,960 B2 | 3/2006 | Howard et al. |
| 7,568,224 B1 * | 7/2009 | Jennings et al. ................ 726/14 |
| 7,610,622 B2 * | 10/2009 | Touitou et al. .................. 726/22 |
| 2002/0143770 A1 | 10/2002 | Schran et al. |
| 2003/0140140 A1 | 7/2003 | Lahtinen |
| 2006/0090067 A1 | 4/2006 | Edmonds et al. |

OTHER PUBLICATIONS

Cisco Systems, "Deployment of Cisco IOS Software-Based SSLVPN in Cisco's Internal Enterprise Class Teleworker Network", Cisco Systems Inc., Oct. 6, 2006, pp. 1-24.
Kolsek, Mitja, "Session Fixation Vulnerability in Web-based Applications", Version 1.0—revision 1, 2002 ACROS d.o.o., pp. 1-16.
Cisco Systems, "Deployment of Cisco IOS Software-Based SSLVPN in Cisco's Internal Enterprise Class Teleworker Network", Cisco Systems Inc., published Oct. 6, 2006, pp. 1-24.
Kolsek, Mitja, "Session Fixation Vulnerability in Web-based Applications", Version 1.0—revision 1, ACROS d.o.o., published Dec. 2002, pp. 1-16.
International Searching Authority, "International Search Report", PCT/US07/83429, dated Jun. 12, 2008, 9 pages.
Claims, PCT/US07/83429, 8 pages.

(Continued)

*Primary Examiner* — Vivek Srivastava
*Assistant Examiner* — Helai Salehi
(74) *Attorney, Agent, or Firm* — Hickman Palermo Truong & Becker LLP (57) ABSTRACT

In one embodiment, an apparatus comprises logic for detecting stolen authentication cookie attacks. A first transport connection is established between a client and a gateway server, where the first transport connection is authenticated by the gateway server. A first authentication cookie is associated with a client session, between the client and the gateway server, that includes the first transport connection. A second transport connection is established at the gateway server. A request is received over the second transport connection. The request includes the first authentication cookie to associate the second transport connection with the client session. A second authentication cookie is generated for the client session and is returned over the second transport connection. Thereafter, a determination is made whether the second authentication cookie is received over the first transport connection. An attack is detected when the second authentication cookie is not received over the first transport connection.

32 Claims, 4 Drawing Sheets

OTHER PUBLICATIONS

"Notification of Transmittal of the International Search Report and the Written Opinion of the International Searching Authority, or the Declaration" received in International application No. PCT/US07/83429 dated May 14, 2009 (10 pages).

Current Claims, PCT/US07/83429 (2009) 8 pages.

European Search Report in EPO Appl No. 07 871 334.4, filed Apr. 8, 2010, Cisco Technology, Inc.

* cited by examiner

Fig. 4

DETECTING STOLEN AUTHENTICATION COOKIE ATTACKS

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical authenticated HyperText Transfer Protocol (HTTP) session, a client is required to present authentication credentials such as, for example, a username/password or some other authentication certificate in order to gain access to resources provided by an HTTP server. At the end of the authentication phase, the client is given an authentication cookie that is used to verify the HTTP requests sent by the client during the HTTP session. Typically, a client can concurrently open multiple Transmission Control Protocol (TCP) connections to send HTTP requests to the HTTP server during an active authenticated HTTP session. The client includes the authentication cookie for the session with each HTTP request sent on any of the TCP connections.

It is possible for an adversary to use malicious code to obtain an authentication cookie that is stored on a client, and thereafter to use the authentication cookie in order to gain unauthorized access by masquerading as the legitimate client. This type of attack, in which an unauthorized entity obtains an authentication cookie from a legitimate client and uses the cookie to gain unauthorized access, is referred to herein as a "stolen cookie attack." For example, the adversary may use some sort of phishing attack to gain access to the cookie file stored at the client and to read any authentication cookies stored therein, or use a network sniffer to intercept the messages sent on clear-text transport connections. Once the adversary obtains an authentication cookie, the adversary can gain unauthorized access by masquerading as the legitimate client since the cookie is used to keep track of the authentication state of the client.

Although the above stolen cookie attack scenario is presented herein for HTTP sessions, it is noted that this attack scenario is not unique to sessions established over the HTTP protocol. Rather, the above attack scenario is possible for any application, presentation, and/or session layer protocol that allows authenticated sessions over a transport layer protocol.

BRIEF DESCRIPTION OF THE DRAWINGS

The techniques for detecting stolen authentication cookie attacks described herein are illustrated by way of example, and not by way of limitation, in the figures of the accompanying drawings and in which like reference numerals refer to similar elements and in which.

DESCRIPTION OF EXAMPLE EMBODIMENTS

Techniques for detecting authentication cookie attacks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
  3.0 Detecting and Thwarting Stolen Authentication Cookie Attacks
    3.1 Example Server-Side Operations
    3.2 Example Client-Side Operations
    3.3 Additional Features and Alternative Embodiments
  4.0 Implementation Mechanisms-Hardware Overview
  5.0 Extensions and Alternatives 1.0 General Overview The needs identified in the foregoing Background, and other needs and objects that will become apparent for the following description, are achieved in the present invention, which comprises, in one embodiment, an apparatus comprising logic encoded in one or more tangible media for detecting stolen authentication cookie attacks. A first transport connection is established between a client and a gateway server, where the first transport connection is authenticated by the gateway server. A first authentication cookie is associated with a client session, between the client and the gateway server, that includes the first transport connection. A second transport connection is established at the gateway server. A request is received at the gateway server over the second transport connection. The request includes the first authentication cookie to associate the second transport connection with the client session. A second authentication cookie is generated for the client session. In response to the request, the second authentication cookie is returned over the second transport connection. Thereafter, a determination is made whether the second authentication cookie is received over the first transport connection. When the second authentication cookie is not received over the first transport connection, a stolen cookie attack is detected.

In one embodiment, the present invention comprises a system configured to detect stolen authentication cookie attacks. The system comprises a gateway server and a client that is operable to communicatively connect to the gateway server. A first logic is coupled to the gateway server, where the first logic when executed is operable to: establish a first transport connection between the client and the gateway server, where the first transport connection is authenticated by the gateway server and where a first authentication cookie is associated with a client session, between the client and the gateway server, that includes the first transport connection; establish a second transport connection at the gateway server; receive a first request at the gateway server over the second transport connection, where the first request includes the first authentication cookie to associate the second transport connection with the client session; generate a second authentication cookie for the client session; in response to the first request, return the second authentication cookie over the second transport connection; after returning the second authentication cookie over the second transport connection, determine whether the second authentication cookie is received over the first transport connection; and detect a stolen cookie attack when the second authentication cookie is not received over the first transport connection. The system further comprises second logic that is coupled to the client, where the second logic when executed is operable to: detect when the first authentication cookie associated with the client session is replaced with the second authentication cookie; and send a second request to the gateway server over the first transport connection in response to detecting that the first authentication cookie is replaced with the second authentication cookie, where the second request includes the second authentication cookie.

In other embodiments, the invention encompasses a computer-readable medium encoded with logic for detecting stolen authentication cookie attacks.

In some embodiments, the techniques for detecting stolen authentication cookie attacks described herein may be implemented using one or more computer programs executing on a network infrastructure element, such as a switch or a router, that is established in a packet-switched network. In some embodiments, the techniques described herein may be implemented by an appliance computer system that is operatively and/or communicatively coupled to a network infrastructure element, such as a router or a switch. In some embodiments, the techniques described herein may be implemented on a host computer system that is communicatively connected to a packet-switched network. Thus, the embodiments described herein are to be regarded in an illustrative rather than a restrictive sense.

2.0 Structural and Functional Overview

As used herein, "server" refers to a combination of one or more software components and an allocation of computational resources, such as memory and one or more processors, where the one or more processors execute the software components, and where the combination of the software components and the computational resources are dedicated to providing a particular type of function on behalf of clients of the server.

As used herein, a "gateway server" refers to any server that is capable of authenticating clients and providing the clients with authentication cookies in response to a successful authentication. Examples of gateway servers include, but are not limited to, gateway servers that provide Virtual Private Network (VPN) access to clients, proxy servers that provide remote clients with access to local network resources, and web servers that provide clients with access to URL-based resources.

As used herein, a "client" refers to one or more software components and an allocation of computational resources, such as memory and one or more processors, where the one or more processors execute the software components and where the one or more software components when executed are operable to request particular types of services provided by one or more servers. Examples of clients include, but are not limited to, web browsers, VPN clients, and various application program clients operable to request various services over local and/or wide area networks.

Figure 1:
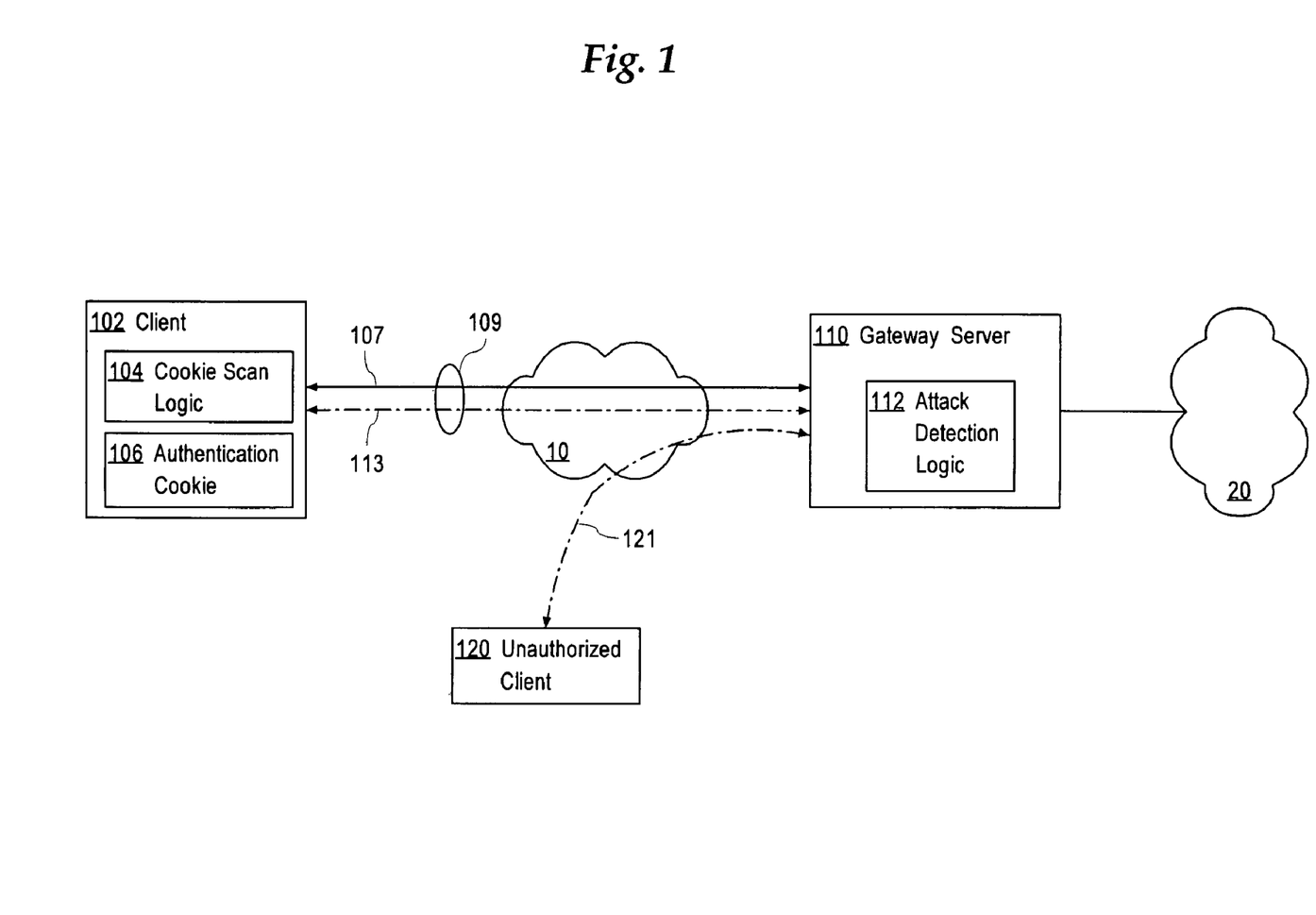
FIG. 1 illustrates an example system operable to detect stolen authentication cookie attacks.

FIG. 1 illustrates an example system operable to detect stolen authentication cookie attacks. Client 102 is operable to communicatively connect to gateway server 110 over network 10. Network 10 may be a Local Area Network (LAN), a Wide Area Network (WAN), or the Internet. Gateway server 110 is configured to provide authenticated access to resources in network 20.

In some embodiments, network 20 may be an enterprise LAN and gateway server 110 may be configured as a VPN proxy server operable to authenticate remote clients and to provide the remote clients with VPN connections to resources in network 20. For example, gateway server 110 may be executing in a router and may be operable to provide a Secure Socket Layer (SSL) VPN application layer protocol connections for HTTP traffic between remote clients, such as, for example, client 102, and web servers established in network 20. In other embodiments, gateway server 110 may be a web server configured to authenticate clients and to process client HTTP requests for URL-based resources that are located in network 20 and/or under the operable control of gateway server 110.

Gateway server 110 comprises attack detection logic 112. When executed, attack detection logic 112 is operable to validate each new transport connection opened in a particular client session based on information received over an existing, and already authenticated, transport connection in the session. As used herein, a "transport connection" refers to a connection between a client and a server that is established over a transport layer protocol such as, for example, the TCP protocol. As used herein, a "client session" refers to a set of transport connections that are used by a client and a server to exchange messages associated with the same authentication credentials.

In some embodiments, attack detection logic 112 may be implemented as one or more sequences of instructions or other logical elements which, when executed by one or more processors, are operable to detect stolen cookie attacks as described herein. In other embodiments, attack detection logic 112 may be implemented as one or more Application-Specific Integrated Circuits (ASIC) which, when executed, are operable to detect stolen cookie attacks as described herein. In yet other embodiments, attack detection logic 112 may be implemented as any combination of software and hardware components operable to detect stolen cookie attacks as described herein.

Client 102 comprises cookie scan logic 104 and one or more authentication cookies such as authentication cookie 106. As used herein, an "authentication cookie" refers to a set of information that identifies an authenticated client session. Examples of information that may be stored in an authentication include, but are not limited to, a session identifier for the client session identified by the authentication cookie, a client identifier of the client that initiated the client session, a network address and/or a port number at the client that are associated with the client session, and a user identifier of the user that initiated the client session. In some embodiments, a client may store an authentication cookie in persistent storage, for example in a file on a hard disk. In other embodiments, a client may store an authentication cookie in a data structure in volatile memory. Thus, as described herein an authentication cookie is not limited to the common usage and definition of the term "cookie"; rather, an authentication cookie described herein refers to any set of information that may be used to identify an authenticated client session.

When executed, cookie scan logic 104 is operable to detect when an authentication cookie, which is associated with a particular session opened by the client, is changed or replaced by a new authentication cookie. When cookie scan logic 104 detects that the authentication cookie for a particular client session is replaced with a new authentication cookie, cookie scan logic 104 sends or causes another component of client 102 to send a new request to gateway server 110 over an existing authenticated transport connection. The new request includes the new authentication cookie in order to signal gateway server 110 that client 102 has received and configured the new authentication cookie for the particular client session.

In some embodiments, client 102 may be a web browser and cookie scan logic 104 may be a plug-in installed and configured to run within the web browser. In other embodiments, cookie scan logic 104 may be an applet or embedded Java Script code that is downloaded by client 102 from gateway server 110. In yet other embodiments, client 102 may be executing in a hardware device (e.g., a Personal Digital Assistant (PDA), a cell phone, etc.) and cookie scan logic 104 may be implemented as an ASIC.

In one operational example, client 102 establishes TCP connection 107 to gateway server 110, and sends an HTTP request over TCP connection 107 to the server. Gateway server 110 requests, and client 102 provides authentication credentials over TCP connection 107. Gateway server 110 validates the authentication credentials and generates authentication cookie 106. Gateway server 110 then creates client session 109 that includes TCP connection 107, and associates authentication cookie 106 with the client session. Gateway server 110 then sends authentication cookie 106 to client 102. Client 102 receives and stores authentication cookie 106. Thereafter, client 102 and gateway server 110 proceed to keep TCP connection 107 open. Subsequently, client 102 includes authentication cookie 106 in each request that is sent over a new TCP connection that is opened to gateway server 110 as part of client session 109.

For example, client 102 opens new TCP connection 113 to gateway server 110, and sends over the new TCP connection 113 an HTTP request that includes authentication cookie 106. Including authentication cookie 106 in the HTTP request is intended to indicate to gateway server 110 that TCP connection 113 belongs to client session 109. Gateway server 110 receives the HTTP request and effectively blocks it until TCP connection 113 is authenticated. In order to authenticate that TCP connection 113 legitimately belongs to client session 109, gateway server 110 or a component thereof, for example, attack detection logic 112, generates a new authentication cookie for client session 109, and returns the new authentication cookie to client 102 over TCP connection 113.

Client 102 receives the new authentication cookie and configures it for client session 109. Cookie scan logic 104 in client 102 detects that the authentication cookie 106 for client session 109 has been replaced by the new authentication cookie, and sends or causes another component of client 102 to send a new HTTP request to gateway server 110 over TCP connection 107. The new HTTP request includes the new authentication cookie.

Gateway server 110 receives the new HTTP request over TCP connection 107. Attack detection logic 112 in gateway server 110 inspects the new HTTP request and determines that the new authentication cookie for client session 109 is included in the new HTTP request. Upon determining that the new authentication cookie has been received over TCP connection 107 which has already been previously authenticated, attack detection logic 112 determines that TCP connection 113 is legitimate—that is, that TCP connection 113 has indeed been open by client 102 and is legitimately part of client session 109. Attack detection logic 112 or another component of gateway server 110 then authenticates TCP connection 113 as part of client session 109. Thereafter, the HTTP request received over TCP connection 113 is unblocked and is allowed to proceed.

Suppose now that before TCP connection 113 is established, an adversary such as unauthorized client 120 obtains authentication cookie 106 and decides to carry out a stolen cookie attack on client session 109. Unauthorized client 120 opens TCP connection 121 to gateway server 110, and sends over the TCP connection 120 an HTTP request that includes authentication cookie 106. By including authentication cookie 106 in the HTTP request, unauthorized client 120 intends masquerade itself as client 102 and to indicate to gateway server 110 that TCP connection 121 belongs to client session 109.

Gateway server 110 receives the HTTP request and effectively blocks it until TCP connection 121 is authenticated. In order to authenticate TCP connection 121, gateway server 110 generates a new authentication cookie for client session 109, and returns the new authentication cookie over TCP connection 121. Thus, unauthorized client 120 receives the new authentication cookie for client session 109; however, the legitimate client 102 never receives the new authentication cookie and thus cannot configure the new cookie for client session 109. Since the legitimate client 102 did not receive and did not configure the new authentication cookie for client session 109, client 102 cannot send to gateway server 110 a new HTTP request with the new authentication cookie over TCP connection 107. Instead, client 102 continues to send HTTP requests over TCP connection 107 with the old authentication cookie 106.

On the other hand, after returning the new authentication cookie for client session 109 over TCP connection 121, attack detection logic 112 in gateway server 110 monitors HTTP requests received over TCP connection 107 to determine whether the new authentication cookie is received thereon. After receiving over TCP connection 107 a preconfigured number of HTTP requests that include the old authentication cookie 106, attack detection logic 112 determines that a stolen cookie attack is being carried out against client session 109. Alternatively, gateway server 110 may start a timer when the new authentication cookie is returned over the TCP connection 121; if the timer expires before the new authentication cookie is returned in an HTTP request over TCP connection 107, then attack detection logic 112 determines that a stolen cookie attack is being carried out against client session 109. Gateway server 110 then rejects and closes the offending TCP connection 121. In this way, unauthorized client 120 is effectively denied access and the stolen authentication cookie attack against client session 109 fails.

Upon detecting the stolen cookie attack against client session 109, gateway server 110 or a component thereof may take one or more additional corrective actions. For example, gateway server 110 may close all TCP connections in client session 109 (e.g. TCP connection 107), delete the client session, and log out client 102. The gateway server 109 may then advise client 102 to login anew, which would result in generating a new authentication cookie for a new client session between client 102 and gateway server 110. In this way the stolen cookie attack by the adversary, unauthorized client 120, is thwarted and the adversary is not allowed access by gateway server 110.

Figure 2:
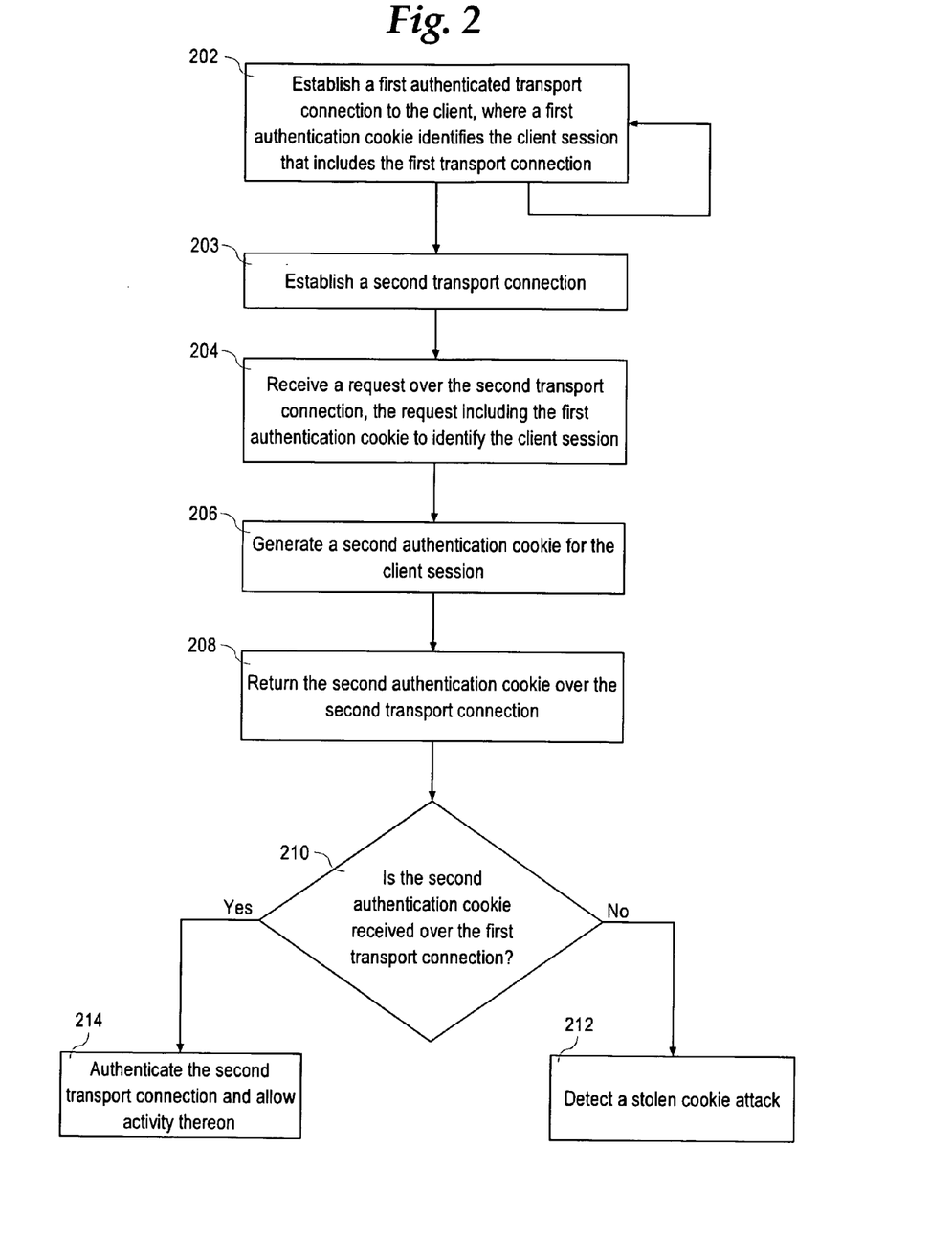
FIG. 2 illustrates example server-side operations of an example method for detecting stolen authentication cookie attacks.

3.0 Detecting and Thwarting Stolen Authentication Cookie Attacks 3.1 Example Server-Side Operations FIG. 2 illustrates example server-side operations of an example method for detecting stolen authentication cookie attacks.

In step 202, a gateway server establishes a first transport connection to a client. For example, in some embodiments the first transport connection may be a TCP connection. The gateway server then receives over the first transport connection an HTTP request for some resources, access to which is controlled by the gateway server. The HTTP request may include, or alternatively the gateway server may additionally request, authentication credentials to authenticate the client to the gateway server. After successfully validating the authentication credentials and authenticating the client, the gateway server creates a client session that includes the first transport connection. The gateway server generates an authentication cookie that is associated with client session and sends the cookie back to client.

Thereafter, the gateway server expects the authentication cookie to be included in each request that is sent over any existing and new transport connection included the client session. Once established and authenticated, the first transport connection and the client session thereof are kept open by the client and the gateway server. In some embodiments, in step 202 the gateway server may send to the client an applet or embedded Java Script code, where the applet or Java Script code when executed at the client may be operable to keep the first transport connection open, to prevent the client session from timing out by periodically sending requests for some known resource on the gateway server (e.g. a known URL page), and/or to detect when the a new authentication cookie for the client session is received at the client.

In some embodiments, the authentication cookie may include data that is opaque to the client. In addition, or instead of, the authentication cookie my be encrypted with a key known only to the gateway server in order to prevent the exposure of the internal structure of the cookie to any adversaries that may be sniffing on the transport connections of the client session.

In step 203, a second transport connection is established at the gateway server. In some embodiments, the second transport connection may be a TCP connection.

In step 204, the gateway server receives a request over the second transport connection, where the request includes the authentication cookie to indicate to the gateway server that the second transport connection is part of an already established client session. For example, in some embodiments the request may be an HTTP request that includes the authentication cookie associated with the client session already established between the client and the gateway server. The gateway server then determines whether the authentication cookie is a valid authentication cookie, and if so, the gateway server further determines the client session identified by the cookie.

In step 206, the gateway server computes a new authentication cookie for the client session. In some embodiments, the new authentication cookie may be derived from the old authentication cookie in some unpredictable manner, for example, by using a new random number or a timestamp. In some embodiments, the gateway server may not use the a source port number specified in the received request since the entropy of the source port number at the client may not be sufficient to randomize the new cookie derivation. In this step, the gateway server generates the new authentication cookie only if the request from the client comes on a new transport connection; otherwise, if the request comes on an existing and authenticated transport connection from the client, refreshing the cookie for the client session is not needed.

In step 208, the gateway server prepares an "HTTP-REDIRECT" (e.g. HTTP code 307: temporary moved) response redirecting the client to some resource known to the client, for example, the same page specified in the request. The newly generated authentication cookie is returned to the client, over the newly established transport connection, using a "Set-Cookie" HTTP header along with the "HTTP-REDIRECT" response. This forces the client to resubmit the request over the new transport connection with the new authentication cookie. The request and the new transport connection on which the request was received are effectively blocked or queued at the gateway server thus preventing access to the requested resources until the new transport connection is authenticated as legitimate.

In some embodiments, in this step the gateway server may also change the session state of the client session. For example, the client session may be marked as "WAIT_FOR_AUTH_COOKIE_TO_BE_SYNCED" state in the server's internal session table in order to indicate that a new authentication cookie is currently being synchronized for the client session.

In some embodiments, in this step the gateway server may also change the connection state of the new transport connection. For example, the new transport connection may be marked as "HTTP_CONN_AUTH_PENDING" in the server's internal connections table in order to indicate that authentication of the new transport connection is currently pending.

After performing step 208, the gateway server expects each new request from the client to carry the new authentication cookie generated for the client session on all existing transport connections that are included in this session. In some embodiments and/or operational contexts, it is possible that some of the client requests on pre-existing transport connections may come with the old authentication cookie even from the legitimate client. This may be due to the random timing differences between the various requests originated by the client on different transport connections as well as network and/or /processing delays in intermediate nodes.

In step 210, the gateway server monitors all requests received on the first transport connection and on any other authenticated transport connections that are included in the client session in order to determine whether the new authentication cookie is received on any of these exiting and authenticated transport connections.

If the gateway server receives, over one or more existing authenticated transport connections, one or more requests that include the new authentication cookie generated for the client session, in step 214 the gateway server authenticates the new transport connection.

In embodiments that keep track of connection states, the gateway server may change the internal state of the new transport connection from "HTTP_CONN_AUTH_PENDING" to "HTTP_CONN_AUTH_DONE" in order to indicate that the new transport connection is authenticated. In embodiments that keep track of session states, the gateway server may change the internal state of the client session from "WAIT_FOR_AUTH_COOKIE_TO_BE_SYNCED" to "AUTH_COOKIE_SYNCED" in order to indicate that the new authentication cookie for the client session is now synched with the client.

After authenticating the new transport connection, the gateway server allows the request received on this connection to proceed. In addition, after authenticating the new transport connection, the gateway server may also re-authenticate each existing transport connection of the client session by forcing the client to send at least one request with the new authentication cookie over each connection. For example, if the gateway server receives a request that includes the old authentication cookie over an existing authenticated transport connection, the gateway server may redirect the request to some known or predetermined page until it receives a request with the new authentication cookie over that connection. In embodiments that keep track of connection states, the gateway server may not use a "Set-Cookie" HTTP header in response to such requests on any transport connection which is in the "HTTP_CONN_AUTH_DONE" state in order not to reveal the new authentication cookie for the client session.

If in step 210 the gateway server receives a pre-configured threshold number of client requests with the old authentication cookie over one and/or any of the existing authenticated transport connections in the client session, in step 212 the gateway server determines that a stolen cookie attack is being carried out against the client session.

In response to detecting that a stolen cookie attack is being carried out against the client session, the gateway server may perform one or more corrective actions to thwart the attack. For example, the gateway server may disconnect the offending transport connection. In some embodiments, the gateway server may change the internal state of the client session to indicate that the session is being hijacked, may inform the client accordingly, and may resets all transport connections included in the session. In some embodiments, the gateway server may close all transport connections included in the hijacked client session and may delete the session. In addition, the gateway server may log the client out, and may require the client to provide its authentication credentials in order to re-login.

3.2 Example Client-Side Operations

Figure 3:
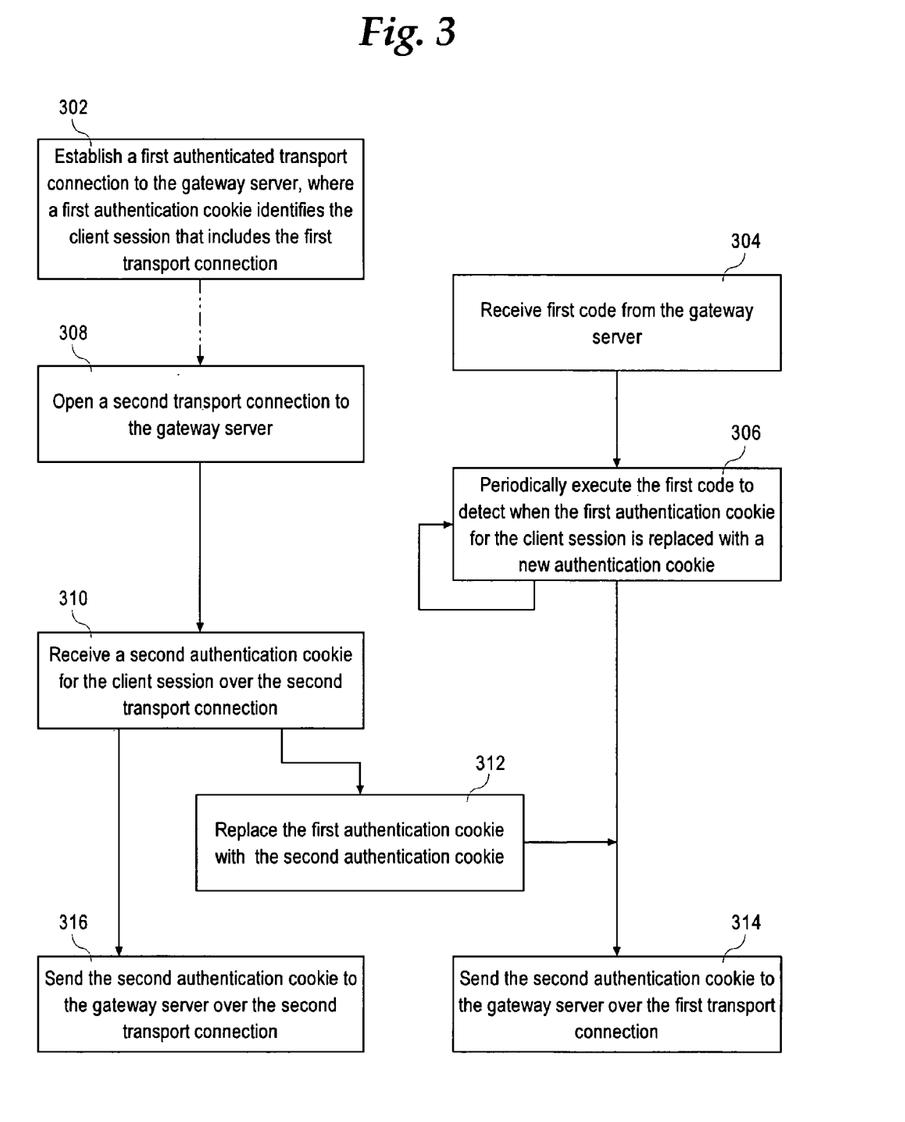
FIG. 3 illustrates example client-side operations of an example method for detecting stolen authentication cookie attacks.

FIG. 3 illustrates example client-side operations of an example method for detecting stolen authentication cookie attacks.

In step 302, a client establishes a first transport connection to a gateway server. For example, in some embodiments the first transport connection may be a TCP connection. The client sends a request that includes authentication credentials over the transport connection, and in response to a successful authentication the gateway server creates a client session that includes the first transport connection, generates an authentication cookie for the session, and sends the authentication cookie back to the client. Thereafter, the client includes the authentication cookie in each request that that the client sends over any existing and/or new transport connection included in the client session. Once established and authenticated, the first transport connection and the client session thereof are kept open by the client and the gateway server.

In step 304, the client receives first code from the gateway server. The first code, when executed at the client, may be operable to keep the first transport connection open, to prevent the client session from timing out by periodically sending requests to the gateway server, and/or to detect when the a new authentication cookie for the client session is received at the client. Step 304 may be performed at the client before, simultaneously with, or after step 302 is performed. For example, in some embodiments the client may be a web browser and the first code may be a plug-in that is pre-installed in the browser. In some embodiments, the gateway server may send the first code to the client in the form of an applet or embedded Java Script code in response to authenticating the client during the establishing of the client session. In some embodiments, the client may download the first code, for example, an applet or a Java Script code, from the gateway server after the first transport connection is established and the client session is created.

After receiving the first code, in step 306 the first code is periodically executed in order to detect when the first authentication cookie for the client session is replaced with a new, second authentication cookie. For example, in some embodiments the first code when executed may poll the client and may cause the client to check whether the authentication cookie for the client session has changed. In some embodiments, the first code, for example an applet or a Java Script code, may scan a cookie file maintained by the client to determine whether any authentication cookie for any client session has been changed or replaced with a new authentication cookie. Whenever the authentication cookie is changed or replaced with a new authentication cookie, the first code may trigger or cause a component of the client to send an HTTP "GET" request for a known URL to the gateway server using the new authentication cookie for the client session. The request with the new authentication cookie would indicate to the gateway server that the client has received and configured the new authentication cookie for the client session.

In step 308, the client opens a new transport connection to the gateway server and sends a request thereon. For example, in some embodiments the request may be an HTTP request that includes the new authentication cookie. Including the new authentication cookie in the request is intended to indicate to the gateway server that the new transport connection belongs to the existing client session. In response to receiving this request, the gateway server generates a new, second authentication cookie for the client session, and sends the new authentication cookie back to the client. In response to receiving the request, the gateway server also blocks or queues the request until the gateway server authenticates the new transport connection as legitimately belonging to the client session In step 310, the client receives the new authentication cookie from the gateway server. The client then replaces the old authentication cookie with the new authentication cookie in step 312. In some embodiments, the gateway server may send the new authentication cookie to the client along with an "HTTP-REDIRECT" response. This response from the gateway server forces the client to resubmit the request over the new transport connection with the new authentication cookie in step 316.

After the client configures the received new authentication cookie for the client session, executing the first code as indicated in step 306 detects that the authentication cookie for the client session has changed. In step 314, executing the first code sends or causes a component of the client to send a new request over the already authenticated first transport connection, where the new request includes the new authentication cookie for the client session. Including the new authentication cookie in the new request and sending the request over the existing and authenticated first transport connection indicates to the gateway server at least: (1) that the client has received and configured the new authentication cookie for the client session; and (2) that it was the client who initiated the new transport connection and therefore the new transport connection is legitimately part of the established client session. In response to receiving the new request over the first transport connection, the gateway server authenticates the new transport connection as legitimately belonging to the client session, and allows the request submitted thereon to proceed.

3.3 Additional Features and Alternative Embodiments

Some embodiments may implement the techniques for detecting stolen cookie attacks described herein over secure transport connections such as, for example, TCP connections over the IP/IPSec network layer protocol and SSL- or Transport Layer Security (TLS)-enabled TCP connections.

In some embodiments, the techniques described herein may be implemented over any connection-oriented transport protocol, such as, for example, TCP or the Stream Control Transmission Protocol (SCTP). In other embodiments, the client-to-server transport connections may be established over a connectionless transport layer protocol, such as, for example, the Datagram Congestion Control Protocol (DCCP). In these embodiments, the client and the gateway server may keep open and track the state of an authenticated session between them as they exchange sequenced datagrams over the connectionless transport protocol. Thus, the techniques described herein are not limited to being implemented with respect to any particular type of transport connections or any particular type of transport layer protocols.

In some embodiments, a gateway server may generate a new authentication cookie in response to receiving a request over a new transport connection, where the request includes an authentication cookie identifying an already existing client session to a particular client. In these embodiments, the gateway server may return the new authentication cookie for the client session to the particular client over an already existing and authenticated transport connection that belongs to the session. In response to receiving the new authentication cookie for the client session, the client may then re-send the request with the new authentication cookie over the new transport connection. In this manner, the gateway server would ensure that any new authentication cookie for a client session is sent only to that client who has an existing, authenticated transport connection that belongs to the client session. On the other hand, an adversary that attempts a stolen cookie attack would never receive the new authentication cookie generated by the gateway server over a newly opened transport connection because the adversary does not have an existing, authenticated transport connection to the server to start with.

Various other features may be included, and various other modifications may be made, to the embodiments of the techniques for detecting stolen cookie attacks described herein. Thus, the embodiments described herein are to be regarded in an illustrative rather than a restrictive sense.

4.0 Implementation Mechanisms—Hardware Overview

Figure 4:
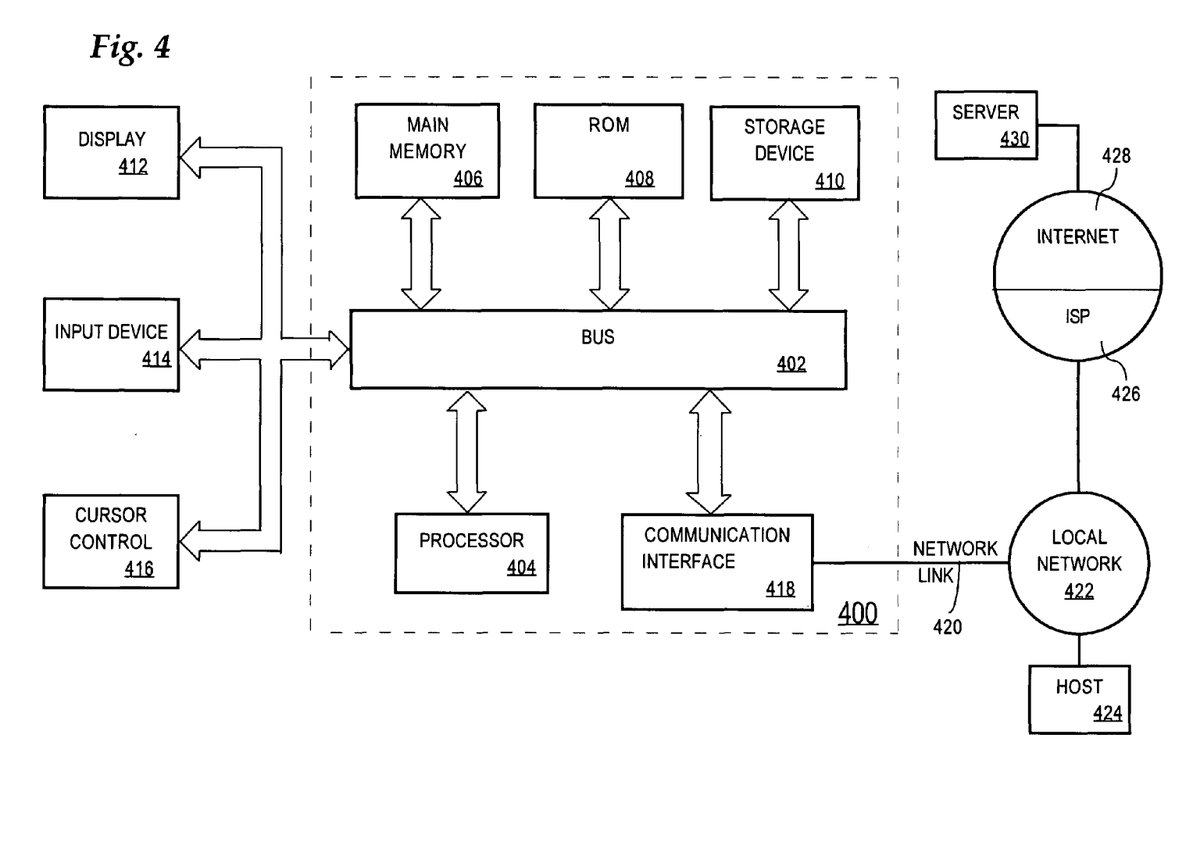
FIG. 4 illustrates a computer system.

FIG. 4 illustrates a computer system 400 upon which embodiments of the techniques for detecting stolen authentication cookie attacks may be implemented. A preferred embodiment is implemented using one or more computer programs running on computer system 400, which is operatively coupled to the backplane of a network infrastructure element such as, for example, a router or a switch.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In one embodiment, computer system 400 is used for detecting stolen authentication cookie attacks. According to this embodiment, detection of stolen authentication cookie attacks is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry or other hardware-based logic may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for detecting stolen authentication cookie attacks as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
one or more processors; and
logic encoded in one or more tangible media for execution and when executed operable to:
establish a first Transmission Control Protocol (TCP) connection between a client and a gateway server, wherein the first TCP connection is authenticated by the gateway server, wherein a first authentication cookie is associated with a client session, between the client and the gateway server, that includes the first TCP connection;
while keeping the first TCP connection open:
establish a second TCP connection at the gateway server;
wherein the second TCP connection is between the gateway server and a different source than the client of the first TCP connection;
receive a HyperText Transfer Protocol (HTTP) request at the gateway server over the second TCP connection, wherein the HTTP request includes the first authentication cookie to associate the second TCP connection with the client session;
generate a second authentication cookie for the client session;
in response to the HTTP request, return the second authentication cookie over the second TCP connection;
after returning the second authentication cookie over the second TCP connection and without returning the second authentication cookie over the first TCP connection, determine whether subsequent requests received over the first TCP connection include the second authentication cookie; and
detect an attack in response to determining that the subsequent requests do not include the second authentication cookie.

2. An apparatus comprising:
one or more processors; and
logic encoded in one or more tangible media for execution and when executed operable to:
establish a first transport connection between a client and a gateway server, wherein the first transport connection is authenticated by the gateway server, wherein a first authentication cookie is associated with a client session, between the client and the gateway server, that includes the first transport connection;
while keeping the first transport connection open:
establish a second transport connection at the gateway server;
wherein the second transport connection is between the gateway server and a different source than the client of the first transport connection;
receive a request at the gateway server over the second transport connection, wherein the request includes the first authentication cookie to associate the second transport connection with the client session;
generate a second authentication cookie for the client session;
in response to the request, return the second authentication cookie over the second transport connection;
after returning the second authentication cookie over the second transport connection and without returning the second authentication cookie over the first transport connection, determine whether subsequent requests received over the first transport connection include the second authentication cookie; and
detect an attack in response to determining that the subsequent requests do not include the second authentication cookie.

3. The apparatus of claim 2, wherein the first authentication cookie is generated at the gateway server based on valid authentication credentials that are received from the client when the client session is created.

4. The apparatus of claim 2, further comprising logic which, when executed, is operable to cause sending first code to the client after the first transport connection is established, wherein the first code when executed at the client is operable to:
detect when the first authentication cookie associated with the client session is replaced with the second authentication cookie; and
in response to detecting that the first authentication cookie is replaced with the second authentication cookie, send a second request to the gateway server over the first transport connection, wherein the second request includes the second authentication cookie.

5. The apparatus of claim 2, further comprising logic which, when executed, is operable to:
change a session state of the client session in response to the request, wherein the changed session state indicates that a new authentication cookie is being synchronized for the client session; and change a connection state of the second transport connection, wherein the changed connection state indicates that authentication of the second transport connection is currently pending.

6. The apparatus of claim 2, wherein the logic that is operable to determine whether subsequent requests received over the first transport connection include the second authentication cookie further comprises logic which, when executed, is operable to:
receive one or more requests over the first transport connection, wherein each of the one or more requests includes the first authentication cookie; and
determine that the second authentication cookie is not received over the first transport connection when the number of the one or more requests exceeds a preconfigured threshold value.

7. The apparatus of claim 2, wherein:
the first transport connection is one of a plurality of transport connections included in the client session that are authenticated by the gateway server; and
the logic that is operable to determine whether subsequent requests received over the first transport connection include the second authentication cookie further comprises logic which, when executed, is operable to:
receive one or more requests over the plurality of transport connections, wherein each of the one or more requests includes the first authentication cookie; and
determine that the second authentication cookie is not received over the first transport connection when the number of the one or more requests exceeds a preconfigured threshold value.

8. The apparatus of claim 2, wherein the logic that is operable to return the second authentication cookie further comprises logic which, when executed, causes an entity that submitted the request to re-submit the request over the second transport connection with the second authentication cookie.

9. The apparatus of claim 2, further comprising logic which, when executed, is operable to perform a corrective action in response to detecting the attack, wherein the corrective action comprises closing all transport connections included in the client session and deleting the client session.

10. The apparatus of claim 2, wherein the gateway server is a Virtual Private Network (VPN) gateway server configured in a network infrastructure element, wherein the VPN gateway server is operable to authenticate remote clients and to provide the remote clients with VPN connections to resources in a particular network.

11. The apparatus of claim 5, further comprising logic which, when executed, is operable to:
determine that the second authentication cookie is received over the first transport connection;
change the session state of the client session to indicate that the second authentication cookie identifies the client session; and
change the connection state of the second transport connection to indicate that the second transport connection is authenticated.

12. Logic encoded in one or more non-transitory media for execution and when executed operable to:
establish a first transport connection between a client and a gateway server, wherein the first transport connection is authenticated by the gateway server, wherein a first authentication cookie is associated with a client session, between the client and the gateway server, that includes the first transport connection;
while keeping the first transport connection open:
establish a second transport connection at the gateway server;
wherein the second transport connection is between the gateway server and a different source than the client of the first transport connection;
receive a request at the gateway server over the second transport connection, wherein the request includes the first authentication cookie to associate the second transport connection with the client session;
generate a second authentication cookie for the client session;
in response to the request, return the second authentication cookie over the second transport connection;
after returning the second authentication cookie over the second transport connection and without returning the second authentication cookie over the first transport connection, determine whether subsequent requests received over the first transport connection include the second authentication cookie; and
detect an attack in response to determining that the subsequent requests do not include the second authentication cookie.

13. The logic encoded in one or more tangible media of claim 12, wherein the first authentication cookie is generated at the gateway server based on valid authentication credentials that are received from the client when the client session is created.

14. The logic encoded in one or more tangible media of claim 12, further operable to cause sending first code to the client after the first transport connection is established, wherein the first code when executed at the client is operable to:
detect when the first authentication cookie associated with the client session is replaced with the second authentication cookie; and
in response to detecting that the first authentication cookie is replaced with the second authentication cookie, send a second request to the gateway server over the first transport connection, wherein the second request includes the second authentication cookie.

15. The logic encoded in one or more tangible media of claim 12, further operable to:
change a session state of the client session in response to the request, wherein the changed session state indicates that a new authentication cookie is being synchronized for the client session; and
change a connection state of the second transport connection, wherein the changed connection state indicates that authentication of the second transport connection is currently pending.

16. The logic encoded in one or more tangible media of claim 12, wherein the logic that is operable to determine whether subsequent requests received over the first transport connection include the second authentication cookie further comprises logic which, when executed, is operable to:
receive one or more requests over the first transport connection, wherein each of the one or more requests includes the first authentication cookie; and
determine that the second authentication cookie is not received over the first transport connection when the number of the one or more requests exceeds a preconfigured threshold value.

17. The logic encoded in one or more tangible media of claim 12, wherein:
the first transport connection is one of a plurality of transport connections included in the client session that are authenticated by the gateway server; and the logic that is operable to determine whether subsequent requests received over the first transport connection include the second authentication cookie further comprises logic which, when executed, is operable to:
receive one or more requests over the plurality of transport connections, wherein each of the one or more requests includes the first authentication cookie; and
determine that the second authentication cookie is not received over the first transport connection when the number of the one or more requests exceeds a preconfigured threshold value.

18. The logic encoded in one or more tangible media of claim 12, wherein the logic that is operable to return the second authentication cookie further comprises logic which, when executed, causes an entity that submitted the request to re-submit the request over the second transport connection with the second authentication cookie.

19. The logic encoded in one or more tangible media of claim 12, further comprising logic which, when executed, is operable to perform a corrective action in response to detecting the attack, wherein the corrective action comprises closing all transport connections included in the client session and deleting the client session.

20. The logic encoded in one or more tangible media of claim 12, wherein the gateway server is a Virtual Private Network (VPN) gateway server configured in a network infrastructure element, wherein the VPN gateway server is operable to authenticate remote clients and to provide the remote clients with VPN connections to resources in a particular network.

21. The logic encoded in one or more tangible media of claim 15, further operable to:
determine that the second authentication cookie is received over the first transport connection;
change the session state of the client session to indicate that the second authentication cookie identifies the client session; and
change the connection state of the second transport connection to indicate that the second transport connection is authenticated.

22. A system comprising:
a gateway server;
a client that is operable to communicatively connect to the gateway server;
first logic coupled to the gateway server, wherein the first logic when executed is operable to:
establish a first transport connection between a client and a gateway server, wherein the first transport connection is authenticated by the gateway server, wherein a first authentication cookie is associated with a client session, between the client and the gateway server, that includes the first transport connection;
while keeping the first transport connection open:
establish a second transport connection at the gateway server, wherein the second transport connection is between the gateway server and a different source than the client of the first transport connection;
receive a request at the gateway server over the second transport connection, wherein the request includes the first authentication cookie to associate the second transport connection with the client session;
generate a second authentication cookie for the client session;
in response to the request, return the second authentication cookie over the second transport connection;
after returning the second authentication cookie over the second transport connection and without returning the second authentication cookie over the first transport connection, determine whether subsequent requests received over the first transport connection include the second authentication cookie; and
detect an attack in response to determining that the subsequent requests do not include the second authentication cookie; and
second logic coupled to the client, wherein the second logic when executed is operable to:
detect when the first authentication cookie associated with the client session is replaced with the second authentication cookie; and
in response to detecting that the first authentication cookie is replaced with the second authentication cookie, send a second request to the gateway server over the first transport connection, wherein the second request includes the second authentication cookie.

23. A method comprising:
establishing a first transport connection between a client and a gateway server, wherein the first transport connection is authenticated by the gateway server, wherein a first authentication cookie is associated with a client session, between the client and the gateway server, that includes the first transport connection;
while keeping the first transport connection open:
establishing a second transport connection at the gateway server, wherein the second transport connection is between the gateway server and a different source than the client of the first transport connection;
receiving a request at the gateway server over the second transport connection, wherein the request includes the first authentication cookie to associate the second transport connection with the client session;
generating a second authentication cookie for the client session;
in response to the request, returning the second authentication cookie over the second transport connection;
after returning the second authentication cookie over the second transport connection and without returning the second authentication cookie over the first transport connection, determining whether requests received over the first transport connection include the second authentication cookie; and
detecting an attack in response to determining that the subsequent requests do not include the second authentication cookie.

24. The method of claim 23, wherein the first authentication cookie is generated at the gateway server based on valid authentication credentials that are received from the client when the client session is created.

25. The method of claim 23, further comprising sending first code to the client after the first transport connection is established, wherein the first code when executed at the client is operable to:
detect when the first authentication cookie associated with the client session is replaced with the second authentication cookie; and
in response to detecting that the first authentication cookie is replaced with the second authentication cookie, send a second request to the gateway server over the first transport connection, wherein the second request includes the second authentication cookie.

26. The method of claim 23, further comprising:
changing a session state of the client session in response to the request, wherein the changed session state indicates that a new authentication cookie is being synchronized for the client session; and
changing a connection state of the second transport connection, wherein the changed connection state indicates that authentication of the second transport connection is currently pending.

27. The method of claim 23, wherein determining whether requests received over the first transport connection include the second authentication cookie comprises:
receiving one or more requests over the first transport connection, wherein each of the one or more requests includes the first authentication cookie; and
determining that the second authentication cookie is not received over the first transport connection when the number of the one or more requests exceeds a preconfigured threshold value.

28. The method of claim 23, wherein:
the first transport connection is one of a plurality of transport connections included in the client session that are authenticated by the gateway server; and
determining whether requests received over the first transport connection include the second authentication cookie comprises:
receiving one or more requests over the plurality of transport connections, wherein each of the one or more requests includes the first authentication cookie; and
determining that the second authentication cookie is not received over the first transport connection when the number of the one or more requests exceeds a preconfigured threshold value.

29. The method of claim 23, wherein returning the second authentication cookie comprises causing an entity that submitted the request to re-submit the request over the second transport connection with the second authentication cookie.

30. The method of claim 23, further comprising performing a corrective action in response to detecting the attack, wherein the corrective action comprises closing all transport connections included in the client session and deleting the client session.

31. The method of claim 23, wherein the gateway server is a Virtual Private Network (VPN) gateway server configured in a network infrastructure element, wherein the VPN gateway server is operable to authenticate remote clients and to provide the remote clients with VPN connections to resources in a particular network.

32. The method of claim 26 further comprising:
determining that the second authentication cookie is received over the first transport connection;
changing the session state of the client session to indicate that the second authentication cookie identifies the client session; and
changing the connection state of the second transport connection to indicate that the second transport connection is authenticated.

* * * * *